(12) United States Patent
Smith et al.

(10) Patent No.: US 8,312,013 B1
(45) Date of Patent: Nov. 13, 2012

(54) ON-DEMAND SERVICE SYSTEM, METHOD AND COMPUTER PROGRAM PRODUCT FOR LINKING A CUSTOM SHARE ROW CAUSE TO A SHARING RECORD ASSOCIATED WITH A CUSTOM OBJECT

(75) Inventors: Andrew Smith, San Francisco, CA (US); Craig Weissman, San Francisco, CA (US); Punit Jain, Cupertino, CA (US)

(73) Assignee: salesforce.com, inc., San Francisco, CA (US)

( * ) Notice: Subject to any disclaimer, the term of this patent is extended or adjusted under 35 U.S.C. 154(b) by 309 days.

(21) Appl. No.: 12/463,320

(22) Filed: May 8, 2009

Related U.S. Application Data

(60) Provisional application No. 61/051,585, filed on May 8, 2008.

(51) Int. Cl.
*G06F 7/00* (2006.01)
*G06F 17/30* (2006.01)

(52) U.S. Cl. .................. 707/726; 707/781; 707/785

(58) Field of Classification Search .............. 707/704, 707/726, 781, 785
See application file for complete search history.

(56) References Cited

U.S. PATENT DOCUMENTS

| | | | | |
|---|---|---|---|---|
| 5,008,853 A * | 4/1991 | Bly et al. | ................ | 715/751 |
| 5,220,657 A * | 6/1993 | Bly et al. | ................ | 711/152 |
| 7,209,929 B2 | 4/2007 | Dominguez, Jr. et al. | ... | 707/1.03 |
| 7,421,740 B2 * | 9/2008 | Fey et al. | ................ | 726/28 |
| 7,636,890 B2 * | 12/2009 | Marcjan et al. | ................ | 715/741 |
| 7,921,299 B1 * | 4/2011 | Anantha et al. | ................ | 713/187 |
| 2002/0129079 A1 * | 9/2002 | Long et al. | ................ | 709/100 |
| 2003/0097360 A1 * | 5/2003 | McGuire et al. | ................ | 707/8 |
| 2003/0097410 A1 * | 5/2003 | Atkins et al. | ................ | 709/206 |
| 2003/0204681 A1 * | 10/2003 | Arajs et al. | ................ | 711/147 |
| 2003/0233404 A1 | 12/2003 | Hopkins | ................ | 709/203 |
| 2004/0030915 A1 * | 2/2004 | Sameshima et al. | ................ | 713/200 |
| 2005/0044426 A1 * | 2/2005 | Vogel et al. | ................ | 713/202 |
| 2005/0065925 A1 | 3/2005 | Weissman et al. | ................ | 707/4 |
| 2005/0097086 A1 * | 5/2005 | Merchant | ................ | 707/3 |
| 2005/0223022 A1 | 10/2005 | Weissman et al. | ................ | 707/102 |
| 2005/0256842 A1 * | 11/2005 | Marcjan et al. | ................ | 707/1 |
| 2005/0283478 A1 | 12/2005 | Choi et al. | ................ | 707/9 |
| 2006/0206834 A1 * | 9/2006 | Fisher et al. | ................ | 715/777 |
| 2006/0288008 A1 * | 12/2006 | Bhattiprolu et al. | ................ | 707/9 |
| 2008/0037720 A1 * | 2/2008 | Thomson et al. | ................ | 379/88.01 |
| 2008/0072238 A1 * | 3/2008 | Monnie et al. | ................ | 719/310 |
| 2009/0276430 A1 * | 11/2009 | Bruso et al. | ................ | 707/8 |
| 2010/0017434 A1 * | 1/2010 | Lowry et al. | ................ | 707/103 R |

OTHER PUBLICATIONS

U.S. Appl. No. 60/828,192, filed Oct. 4, 2006.

* cited by examiner

*Primary Examiner* — Phong Nguyen
(74) *Attorney, Agent, or Firm* — Zilka-Kotab, PC

(57) ABSTRACT

In accordance with embodiments, there are provided mechanisms and methods for linking a custom share row cause to a sharing record associated with a custom object in an on-demand service. These mechanisms and methods for linking custom share row causes to sharing records associated with an instance of a custom object in an on-demand service can enable a user or code executed by a user to share a custom object record with one or more users and to specify a custom row cause in that sharing record. The ability of embodiments to link custom share row causes to sharing records may allow users of such on-demand services to utilize custom row causes to determine why a sharing record was added and to identify the source of a sharing record.

24 Claims, 4 Drawing Sheets

ON-DEMAND SERVICE SYSTEM, METHOD AND COMPUTER PROGRAM PRODUCT FOR LINKING A CUSTOM SHARE ROW CAUSE TO A SHARING RECORD ASSOCIATED WITH A CUSTOM OBJECT

CLAIM OF PRIORITY

This application claims priority to U.S. Provisional Patent Application 61/051,585 entitled "Method And System For Determining A Sharing Rule In A Computing Language For On-Demand Services," by Andrew Smith et al., filed May 8, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to database systems, and more particularly to sharing records in such database systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the users own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to allow users of such database systems the flexibility of sharing records developed in the context of such database systems. To date, however, such records generally may only be used by an owner of the record and an administrator of an organization associated with the owner.

BRIEF SUMMARY

In accordance with embodiments, there are provided mechanisms and methods for linking a custom share row cause to a sharing record associated with a custom object in an on-demand service. These mechanisms and methods for linking custom share row causes to sharing records associated with an instance of a custom object in an on-demand service can enable a user or code executed by a user to share a custom object record with one or more users and to specify a custom row cause in that sharing record. The ability of embodiments to link custom share row causes to sharing records may allow users of such on-demand services to utilize custom row causes to determine why a sharing record was added and to identify the source of a sharing record.

In an embodiment and by way of example, a method is provided for linking a custom share row cause to a sharing record associated with a custom object in an on-demand service. In use, a custom share row cause for a custom object managed by the on-demand service is received from one of a plurality of tenants of an on-demand service. Additionally, the custom share row cause is linked to a sharing record associated with an instance of the custom object.

While the present invention is described with reference to an embodiment in which techniques for linking a custom share row cause to a sharing record associated with a custom object are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for linking a custom share row cause to a sharing record associated with a custom object in an on-demand service.

Often, it is desirable to allow users of on-demand database systems the flexibility of sharing records developed in the context of such database systems. To date, however, such records may only be used by an owner of the record and an administrator of an organization associated with the owner.

Thus, mechanisms and methods are provided herein for linking a custom share row cause to a sharing record associated with a custom object in an on-demand service. These mechanisms and methods for linking custom share row causes to sharing records associated with an instance of a custom object in an on-demand service can enable a user or code executed by a user to share a custom object record with one or more users and to specify a custom row cause in that sharing record. The ability of embodiments to link custom share row causes to sharing records may allow users of such on-demand services to utilize custom row causes to determine why a sharing record was added and to identify the source of a sharing record.

Next, mechanisms and methods linking a custom share row cause to a sharing record associated with a custom object in an on-demand service will be described with reference to exemplary embodiments.

Figure 1:
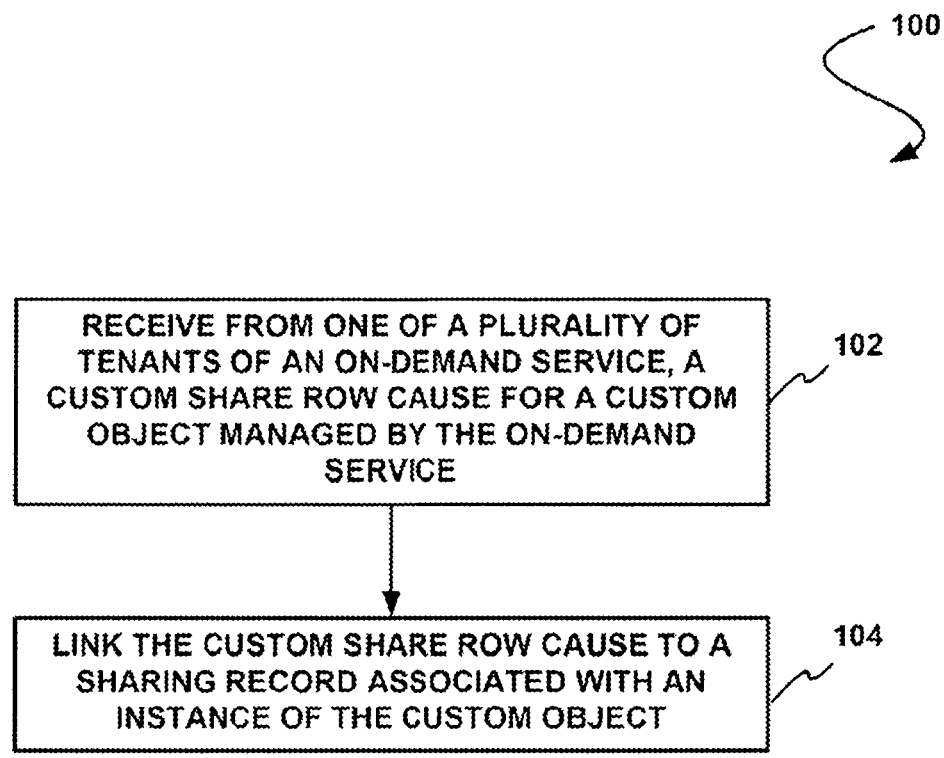
FIG. 1 shows a method for linking a custom share row cause to a sharing record associated with a custom object in an on-demand service, in accordance with one embodiment.

FIG. 1 shows a Method 100 for linking a custom share row cause to a sharing record associated with a custom object in an on-demand service, in accordance with one embodiment. As shown, a custom share row cause for a custom object managed by an on-demand service is received from one of a plurality of tenants of the on-demand service. See operation 102.

In the context of the present description, an on-demand service refers to any service that relies on a system that is accessible over a network. For example, in one embodiment, the on-demand service may include an on-demand database service. An on-demand database service may include any service that relies on a database system that is accessible over a network.

In one embodiment, the on-demand database service may include a multi-tenant on-demand database service. In the present description, such multi-tenant on-demand. database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

Additionally, in the context of the present description, a custom share row cause refers to any identifier capable of being used in the process of sharing one or more objects or portions of objects, where the identifier is capable of distinguishing one sharing record from another. In this case, objects may refer to any table, portion of a table, or any other data structure. In addition, custom objects refer to any object capable of being created and/or modified by a user.

Accordingly, a custom object definition refers to any item defining a custom object. The custom object definition may be defined by any suitable computer code and/or data structure.

Once the custom share row cause definition is received, the custom share row cause is linked to a sharing record associated with an instance of the custom object. See operation 104. In one embodiment, the custom share row cause for the custom object may be received from a tenant administrator. Additionally, the use of a custom row cause in a sharing record may allow a maintaining of access granted by that sharing record associated with a custom object record during an ownership change.

In another embodiment, non-administrators may be blocked from deleting share rows that include a specific custom row cause. Additionally, the non-administrators may be blocked from manipulating the sharing related to an instance of a custom object.

Furthermore, in one embodiment, the tenants of the on-demand service may be capable of defining the custom object. Additionally, the tenants of the on-demand service may be capable of defining the custom share row cause.

In one embodiment, the instance of the custom object may be modified by adding sharing rows to the instance of the custom object. In this case, the tenants of the on-demand service may be capable of adding sharing rows to the instance of the custom object multiple times using different custom row causes (e.g. on multiple occasions, multiple times on one occasion, etc.).

In one embodiment, a plurality of sharing records using a custom share row cause may be received by the tenants of the on-demand service. It may then be determined whether each of the sharing records using the custom share row cause is different. In this way, the tenants of the on-demand service may be capable of adding sharing rows associated with each of the plurality of custom share row cause definitions to the instance of the custom object multiple times, if it is determined that each of sharing rows are different based on the custom row cause and user specified in the sharing row.

In one embodiment, when a command to insert a sharing record for a particular instance of a custom object is received, the presence of a custom row cause may be used to determine whether a new sharing record is inserted or an existing record is upserted. In this case, the user or group of users being shared to in the sharing record are also used to determine whether the sharing record is unique.

It should be noted that, as an option, the custom share row cause definition may be packaged and distributed to other tenants in the service. Additionally, it should be noted that the name of the custom row cause can be translated.

Using this technique, a user may optionally define custom row cause definitions for a custom object definition. Furthermore, a user or code executed by a user may share a custom object record with one or more users and specify a custom row cause in that sharing record. Additionally, the custom row cause may be utilized to determining why a sharing record was added. It may also be used to identify the source of the sharing record. The usage of the custom row cause in a sharing record may determine which users/code may update/delete the sharing record. Still yet, the usage of the custom row cause in a sharing record may determine if the sharing record should be updated/deleted when an operation is performed on the related custom object record.

Figure 2:
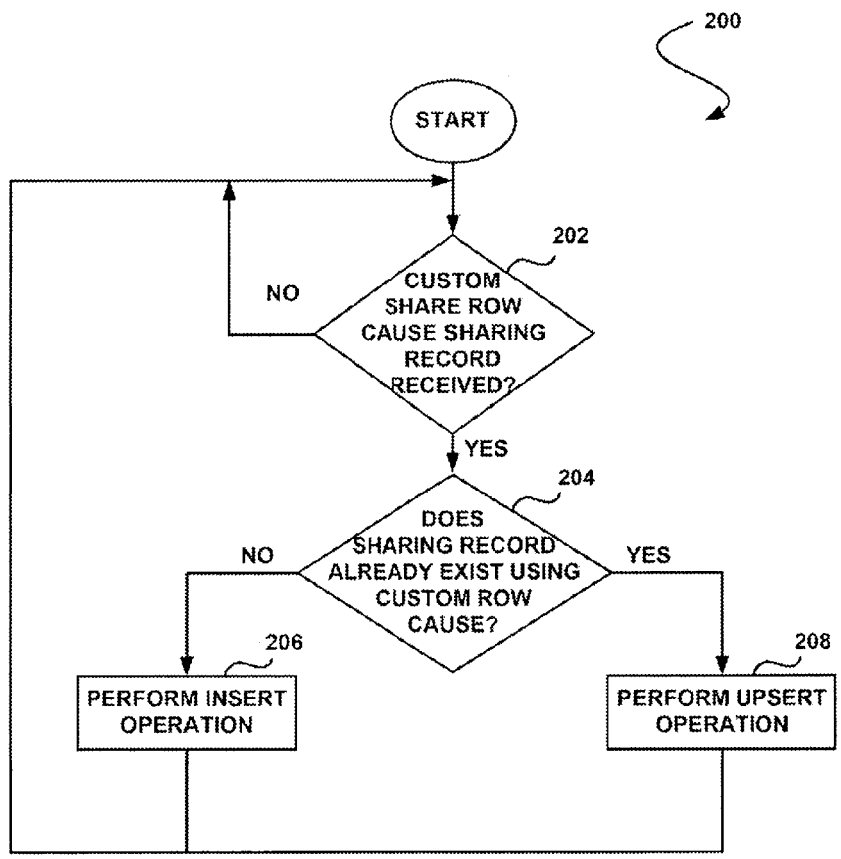
FIG. 2 shows a method for linking a custom share row cause to a sharing record associated with a custom object in an on-demand service, in accordance with another embodiment.

FIG. 2 shows a method 200 for linking a custom share row cause to a sharing record associated with a custom object in an on-demand service, in accordance with another embodiment. As an option, the present method 200 may be implemented in the context of the functionality of FIG. 1. Of course, however, the method 200 may be implemented in any desired environment. The aforementioned definitions may apply during the present description.

As shown, it is determined whether a custom share row cause sharing record is received. See operation 202. If a custom share row cause sharing record is received, it is determined whether the sharing record already exists using that custom row cause. See operation 204.

If the sharing record does not already exist using that custom row cause, an insert operation is performed. See operation 206. If the sharing record already exists using that custom row cause, an upsert operation is performed. See operation 208.

Using the techniques described above, one-off sharing may be implemented in the context of custom objects. One-off sharing refers to any type of manual sharing. In one embodiment, one-off sharing may be designed for use by end users, specifically the record owner. In another embodiment, the use of this feature may be utilized for handling all types of custom sharing logic and requirements.

At a basic level, administrators may desire a way to write one-off sharing and maintain the access during a change of owner. In a subset of cases, the administrator may desire to block non-administrators from deleting the share rows. Developers of an application may also desire to implement write sharing (e.g. in Apex, etc.), protect this sharing from user deletion (e.g. including administrators, etc.), and easily determine why the share row was written.

For instance, for some objects, ownership may be a meaningless concept and thus a change in ownership may not imply any alteration to record sharing. There may be no need to prevent deletion of the sharing added by the owner or any users with full access. For example, the owner of a "transaction" record in a financial application may not have a functional meaning and thus changing the owner may not alter the sharing. Further, records may be permitted to be created without an owner.

In another case, for an administrator configuring a customer portal, there may be a number of times when sharing an account to a portal user may be necessary to provide access to that information associated with that account. For instance, if a user works for a first company, the user may service an account associated with a second company and the user may need to log cases for that account. The portal administrator may manually share the account associated with the second company with a contact associated with the first company (e.g. a portal user, etc.). In this case, the share may be removed when the account owner associated with the second company changes.

In some cases, there may be many users (e.g. customers, etc.) that may have built external batch jobs that maintain appropriate record visibility via an API by writing the necessary shares. For instance, an external system may assign record visibility, where shares written by that system may remain regardless of whether the record owner changes. In these cases, customers may also prefer that these shares are protected from deletion by a standard user. Since integrations may make errors in some cases, an administrator may be able to add/edit/delete shares as if operating as the integration. In this case, the administrator may not be blocked from making changes to these rows.

Still yet, developers (e.g. Apex developers, etc.) may desire to write their own shares using their custom logic. As an option, any user, including an administrator, may not be able to modify/delete written shares. The administrator may need to run a recalculation process (e.g. in Apex, etc.) to correct errors in the sharing. In addition, the sharing rows may need a namespace to determine their origin. In other words, application A may not be able to alter the sharing written by application B.

When authoring code (e.g. Apex code, etc.), a developer may be able to use a standard API and UI to add/edit/delete written shares (e.g. share written in Apex, etc.). It should be noted that, custom sharing row causes may be of value because a developer can write multiple rows for the same user/group and may easily determine why they were granted access. When it is time to update/remove the access, the developer can simply look for a user/group ID and the appropriate row cause. In this way, the developers may not have to go through the logic of trying to maintain one row for multiple reasons.

Using these techniques, there may be no need to check whether user is also the owner of record (e.g. no write sharing for an owner). Furthermore, there is not any concern about end users or administrators deleting or altering shares.

In one embodiment, custom sharing row causes may act as a tool for developers to determine why a share was written.

As an option, custom sharing row causes may be defined declaratively and associated with an object. In various embodiments, the various profile permissions may be needed to define row causes. For example, in one embodiment, permissions may include a "Customize Application" and "Author Apex" may be required.

In various embodiments, custom sharing row causes may include a label definition, a name definition (e.g. unique within a namespace and object, etc.), a namespace definition (e.g. for packaging, etc.), a related object definition, a created by/date definition, and a last modified by/date definition.

When deleting a custom sharing row cause, all shares that use the row cause may also be deleted. Similar to deleting a custom field, the administrator may be warned of the impact. As an option, if code is referencing a custom sharing row cause, a user may not delete the row cause or change the name definition.

In one embodiment, shares using a row cause may not be created/manipulated through a user interface or API by any users. Furthermore, shares for the same user may be added multiple times, assuming the sharing row cause is different for each row. An insert of a user with a row cause already present may mirror the existing behavior and perform an upsert operation.

As an option, shares using a custom sharing row cause may not be removed during an owner change. Additionally, in one embodiment, code may only alter shares using a custom sharing row cause from within the same namespace.

With respect to the API for implementing custom sharing, a developer may supply a custom sharing row cause in a rowCause column to create a share using a custom sharing row cause. In one embodiment, this may only be possible in a developer mode.

Furthermore, as an option, leaving the rowCause field null may result in a manual share. Additionally, this field may be editable such that inserting a row with the rowCause "manual" or null may result in a manual share. In one embodiment, the rowCause field may not be updatable, only creatable.

With respect to packaging of custom sharing row cause, as an option custom sharing row causes may be packaged. Furthermore, custom sharing row causes may be considered developer-controlled (e.g. all attributes, etc.). In various embodiments, these may be packaged in a managed or unmanaged package.

In this case, code in a managed package may add/edit/delete shares. Furthermore, in one embodiment, the label of a custom sharing row cause may be enabled for translation in the translation workbench. In this case, translations may be packaged when a row cause is added. As an option, an uninstall of a package may delete shares that use a custom sharing row cause being uninstalled.

Still yet, in one embodiment, a manage users profile permission may be required for users to be able to create/edit or delete custom share row causes. Furthermore, a manage sharing profile permission may be used to control the CRUD operations on share row causes. Different profile permissions may be required for users to be able to use custom share row causes for writing shares. In this case, users who do not have this profile permission may not be able to use share row cause other than "Manual Sharing" in the UI or the API. In one embodiment, users may be able to see the share rows that have been written using custom share row causes in sharing details and expanded sharing pages.

System Overview

Figure 3:
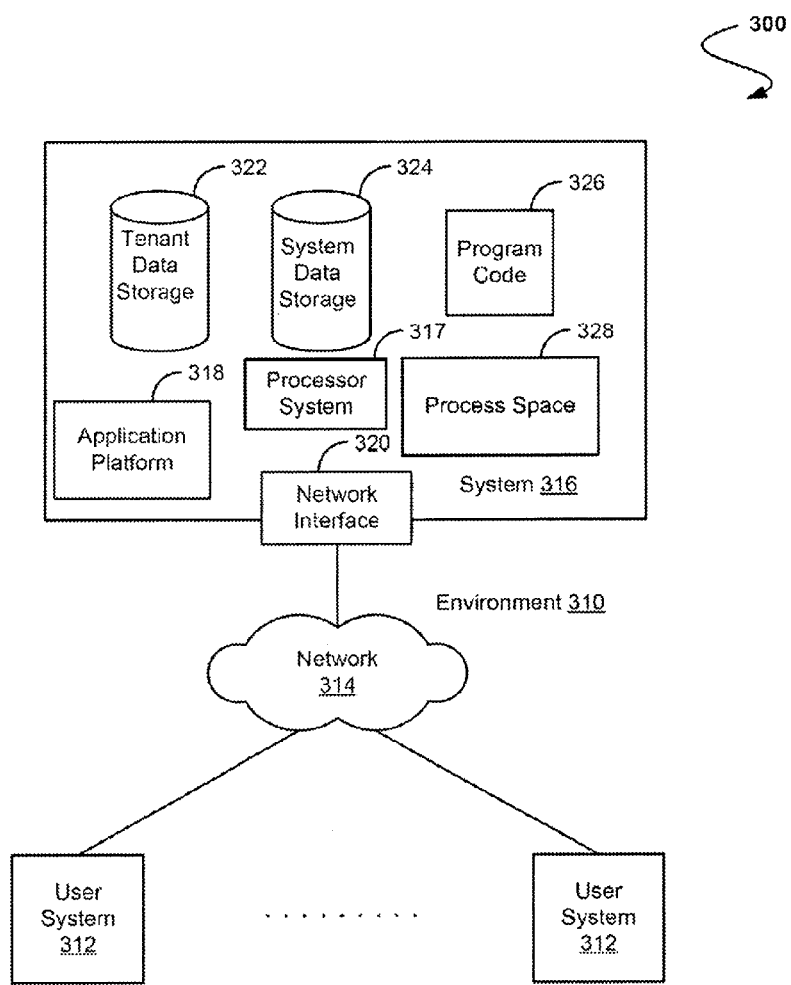
FIG. 3 illustrates a block diagram of an example of an environment wherein an on-demand database service might be used.

FIG. 3 illustrates a block diagram of an environment 310 wherein an on-demand database service might be used. As an option, any of the previously described embodiments of the foregoing figures may or may not be implemented in the context of the environment 310. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed. above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software. e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

Figure 4:
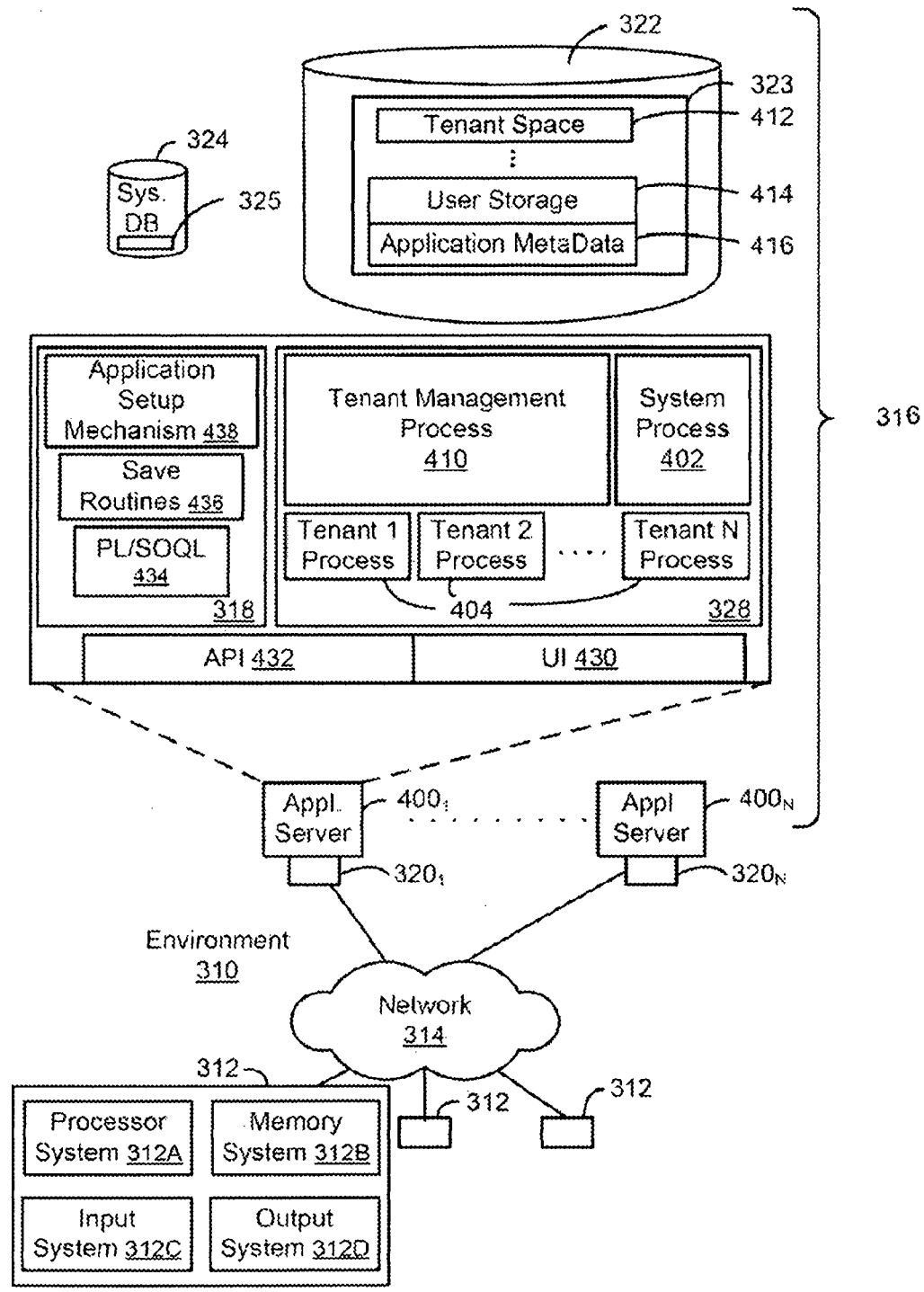
FIG. 4 illustrates a block diagram of an embodiment of elements of FIG. 3 and various possible interconnections between these elements.

One arrangement for elements of system 316 is shown in FIG. 4, including a network interface 320, application platform 318, tenant data storage 322 for tenant data 323, system data storage 324 for system data accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317 of FIG. 3, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 31.6 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410.

Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled. "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004;US2005/0283478, titled "SOAP-BASED WEB SERVICES IN A MULTI-TENANT DATABASE SYSTEM," filed Jun. 16, 2004; and/or US2006/0206834, titled "SYSTEMS AND METHODS FOR IMPLEMENTING MULTI-APPLICATION TABS AND TAB SETS," filed Mar. 8, 2005; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer implemented method, comprising:
receiving from one of a plurality of tenants of an on-demand service, a custom share row cause for a custom object managed by the on-demand service; and
linking the custom share row cause to a sharing record associated with an instance of the custom object;
wherein the sharing record controls access by users to the instance of the custom object by specifying at least one of the users to which access to the instance of the custom object is granted, and wherein the custom share row cause is linked to the sharing record for uniquely identifying the sharing record specifying the at least one of the users to which the access to the instance of the custom object is granted and for describing an event prompting creation of the sharing record;
wherein adding the sharing record to the instance of the custom object is in response to a determination that the sharing record is different from other sharing records previously added to the instance of the custom object, wherein the determination is based on the custom share row cause linked to the sharing record and the at least one of the users specified by the sharing record.

2. The method of claim 1, wherein the custom share row cause for the custom object managed by the on-demand service is received from a tenant administrator.

3. The method of claim 2, wherein the use of the custom row cause in a sharing record allows a maintaining of access granted by an associated sharing record during an ownership change.

4. The method of claim 1, further comprising blocking non-administrators from manipulating the sharing related to the instance of the custom object using a custom sharing row cause.

5. The method of claim 4, wherein blocking the non-administrators from manipulating the sharing related to the instance of the custom object includes blocking the non-administrators from deleting share rows associated with the custom object using a custom sharing row cause.

6. The method of claim 1, wherein the one of the plurality of tenants of the on-demand service is capable of defining the custom object.

7. The method of claim 6, wherein the one of the plurality of tenants of the on-demand service is capable of defining the custom share row cause.

8. The method of claim 1, wherein the one of the plurality of tenants of the on-demand service is capable of adding sharing rows to the instance of the custom object multiple times.

9. The method of claim 8, wherein a plurality of sharing records using a custom share row cause are received by the one of a plurality of tenants of the on-demand service.

10. The method of claim 9, further comprising determining whether each of the sharing records using the custom share row cause is different.

11. The method of claim 10, wherein the one of a plurality of tenants of the on-demand service are capable of adding sharing rows to the instance of the custom object multiple times, if it is determined that each of the plurality of sharing rows are different based on the custom row cause and user specified in the sharing row.

12. The method of claim 1, wherein the presence of the custom share row cause is used to determine whether a new sharing record is inserted or an existing record is upserted.

13. The method of claim 1, wherein the presence of the custom share row cause is used to identify a source of the sharing record.

14. The method of claim 1, wherein an upsert operation is performed in response to a command to insert a sharing row, if it is determined that the sharing row to be inserted is already present in the custom object.

15. The method of claim 1, wherein the custom share row cause definition is packaged for distribution to other tenants.

16. The method of claim 1, wherein one or more labels associated with the custom share row cause definition are translatable.

17. The method of claim 1, wherein the on-demand service includes a multi-tenant on-demand database service.

18. The method of claim 1, wherein a plurality of sharing records are associated with the instance of the custom object by being added to the instance of the custom object.

19. The method of claim 18, wherein the custom share row cause linked to the sharing record is used to distinguish the sharing record from remaining ones of the plurality of sharing records associated with the instance of the custom object.

20. The method of claim 18, wherein each of the sharing records indicates at least one of a user and code with which the instance of the custom object is shared, for enabling access to the instance of the custom object by the at least one of the user and the code.

21. A tangible machine-readable medium carrying one or more sequences of instructions which, when executed by one or more processors, cause the one or more processors to carry out the steps of:
    receiving from one of a plurality of tenants of an on-demand service, a custom share row cause for a custom object managed by the on-demand service; and
    linking the custom share row cause to a sharing record associated with an instance of the custom object;
    wherein the sharing record controls access by users to the instance of the custom object by specifying at least one of the users to which access to the instance of the custom object is granted, and wherein the custom share row cause is linked to the sharing record for uniquely identifying the sharing record specifying the at least one of the users to which the access to the instance of the custom object is granted and for describing an event prompting creation of the sharing record;
    wherein adding the sharing record to the instance of the custom object is in response to a determination that the sharing record is different from other sharing records previously added to the instance of the custom object, wherein the determination is based on the custom share row cause linked to the sharing record and the at least one of the users specified by the sharing record.

22. An apparatus, comprising:
    a processor; and
    one or more stored sequences of instructions which, when executed by the processor, cause the processor to carry out the steps of:
        receiving from one of a plurality of tenants of an on-demand service, a custom share row cause for a custom object managed by the on-demand service; and
        linking the custom share row cause to a sharing record associated with an instance of the custom object;
    wherein the sharing record controls access by users to the instance of the custom object by specifying at least one of the users to which access to the instance of the custom object is granted, and wherein the custom share row cause is linked to the sharing record for uniquely identifying the sharing record specifying the at least one of the users to which the access to the instance of the custom object is granted and for describing an event prompting creation of the sharing record;
    wherein adding the sharing record to the instance of the custom object is in response to a determination that the sharing record is different from other sharing records previously added to the instance of the custom object, wherein the determination is based on the custom share row cause linked to the sharing record and the at least one of the users specified by the sharing record.

23. A computer implemented method for transmitting code for use in a multi-tenant database system on a transmission medium, the method comprising:
    transmitting code for receiving from one of a plurality of tenants of an on-demand service, a custom share row cause for a custom object managed by the on-demand service; and
    transmitting code for linking the custom share row cause to a sharing record associated with an instance of the custom object;
    wherein the sharing record controls access by users to the instance of the custom object by specifying at least one of the users to which access to the instance of the custom object is granted, and wherein the custom share row cause is linked to the sharing record for uniquely identifying the sharing record specifying the at least one of the users to which the access to the instance of the custom object is granted and for describing an event prompting creation of the sharing record;
    wherein adding the sharing record to the instance of the custom object is in response to a determination that the sharing record is different from other sharing records previously added to the instance of the custom object, wherein the determination is based on the custom share row cause linked to the sharing record and the at least one of the users specified by the sharing record.

24. A computer implemented method, comprising:
    receiving from one of a plurality of tenants of an on-demand service, a custom share row cause for a custom object managed by the on-demand service; and
    linking the custom share row cause to a sharing record associated with an instance of the custom object;
    wherein the sharing record controls access by users to the instance of the custom object by specifying at least one of the users to which access to the instance of the custom object is granted, and wherein the custom share row cause is linked to the sharing record for uniquely identifying the sharing record specifying the at least one of the users to which the access to the instance of the custom object is granted and for describing an event prompting creation of the sharing record;
    wherein multiple sharing records are added to the instance of the object, each of the sharing records specifying the at least one of the users to which access to the instance of the custom object is granted and linked to a different custom share row cause describing a different event prompting creation of the sharing record, such that a single sharing record specifying the at least one of the users to which access to the instance of the custom object is granted is prevented from being associated with multiple descriptions of different events prompting the granting of access to the instance of the custom object by the at least one user.

* * * * *